United States Patent
Splitz et al.

(10) Patent No.: US 10,097,411 B2
(45) Date of Patent: Oct. 9, 2018

(54) NODE MIGRATION

(71) Applicant: Mueller International, LLC, Atlanta, GA (US)

(72) Inventors: David Edwin Splitz, Sandwich, MA (US); Dale McLeod Magley, Norton, MA (US); Brent Dukes, Raynham, MA (US)

(73) Assignee: Mueller International, LLC, Atlanta, GA (US)

( * ) Notice: Subject to any disclaimer, the term of this patent is extended or adjusted under 35 U.S.C. 154(b) by 0 days.

(21) Appl. No.: 15/161,448

(22) Filed: May 23, 2016

(65) Prior Publication Data

US 2017/0339016 A1    Nov. 23, 2017

(51) Int. Cl.
*H04L 12/28* (2006.01)
*H04L 12/24* (2006.01)
*H04L 29/08* (2006.01)

(52) U.S. Cl.
CPC .......... *H04L 41/0813* (2013.01); *H04L 67/12* (2013.01)

(58) Field of Classification Search
None
See application file for complete search history.

(56) References Cited

U.S. PATENT DOCUMENTS

| | | |
|---|---|---|
| 5,371,734 A | 12/1994 | Fischer |
| 5,438,329 A | 8/1995 | Gastouniotis et al. |
| 5,594,776 A | 1/1997 | Dent |
| 5,666,655 A | 9/1997 | Ishikawa et al. |
| 5,774,733 A | 6/1998 | Nolan et al. |
| 5,787,358 A | 7/1998 | Takahashi |
| 5,892,441 A | 4/1999 | Woolley et al. |
| 5,963,557 A | 10/1999 | Eng |
| 6,028,855 A | 2/2000 | Hirsch |
| 6,031,466 A | 2/2000 | Leshets et al. |
| 6,405,047 B1 | 6/2002 | Moon |
| 6,900,737 B1 | 5/2005 | Ardalan |
| 7,123,628 B1 | 10/2006 | Hwang |

(Continued)

FOREIGN PATENT DOCUMENTS

| | | |
|---|---|---|
| WO | 2009133237 | 11/2009 |
| WO | 2013062571 | 5/2013 |

(Continued)

OTHER PUBLICATIONS

Splitz, David Edwin; Final Office Action for U.S. Appl. No. 14/490,081, filed Sep. 18, 2014, dated Jan. 11, 2017; 23 pgs.

(Continued)

*Primary Examiner* — Otis L Thompson, Jr.
(74) *Attorney, Agent, or Firm* — Taylor English Duma LLP

(57) ABSTRACT

A method includes periodically sending an Advanced Meter Reading (AMR) beacon from a node at a first regular time interval, the AMR beacon containing a register identification and a reading detected by the node, and periodically listening, at the node, for a communication such that instances of listening occur at a second regular time interval smaller than the first time interval. In one aspect of the disclosure, the communication is a mobile command from a mobile transceiver. In another aspect of the disclosure, the communication is a Network System Status Request or a parent assignment command from a stationary transceiver.

19 Claims, 8 Drawing Sheets

(56) References Cited

U.S. PATENT DOCUMENTS

| | | |
|---|---|---|
| 7,272,635 B1 | 9/2007 | Longtin et al. |
| 7,313,164 B1 | 12/2007 | Wilson et al. |
| 7,346,030 B2 | 3/2008 | Cornwall |
| 7,420,942 B2 | 9/2008 | Wang |
| 7,564,826 B2 | 7/2009 | Sherman et al. |
| 7,760,703 B2 | 7/2010 | Kubler et al. |
| 7,843,379 B2 | 11/2010 | Menzer et al. |
| 7,962,101 B2 | 6/2011 | Vaswani et al. |
| 8,014,791 B2 | 9/2011 | Guigne et al. |
| 8,194,636 B1 | 6/2012 | Doherty et al. |
| 8,300,626 B2 | 10/2012 | Thubert et al. |
| 8,375,134 B2 | 2/2013 | Herzog et al. |
| 8,391,177 B2 | 3/2013 | Picard |
| 8,660,134 B2 | 2/2014 | Splitz |
| 8,855,569 B2 | 10/2014 | Splitz |
| 9,179,502 B2 | 11/2015 | Fischer |
| 9,565,620 B2 | 2/2017 | Dukes |
| 9,743,458 B2 | 8/2017 | Jain et al. |
| 9,756,089 B2 | 9/2017 | Brook |
| 9,807,793 B2 | 10/2017 | Fischer |
| 9,883,548 B2 | 1/2018 | Backholm et al. |
| 10,039,018 B2 | 7/2018 | Splitz et al. |
| 2002/0051546 A1 | 5/2002 | Bizjak |
| 2002/0159434 A1 | 10/2002 | Gosior et al. |
| 2005/0078631 A1 | 4/2005 | Cornwell |
| 2005/0190784 A1 | 9/2005 | Stine |
| 2005/0249170 A1 | 11/2005 | Salokannel et al. |
| 2006/0187866 A1 | 8/2006 | Werb |
| 2006/0245440 A1 | 11/2006 | Mizukoshi |
| 2006/0268746 A1 | 11/2006 | Wijting et al. |
| 2006/0274673 A1 | 12/2006 | Fleury |
| 2007/0014269 A1 | 1/2007 | Sherman et al. |
| 2007/0091825 A1 | 4/2007 | Budampati et al. |
| 2007/0286136 A1* | 12/2007 | Rittle .................. H04W 8/005 370/338 |
| 2007/0293221 A1 | 12/2007 | Hwang et al. |
| 2008/0043637 A1 | 2/2008 | Rahman |
| 2008/0086560 A1 | 4/2008 | Monier et al. |
| 2008/0240078 A1 | 10/2008 | Thubert |
| 2009/0201169 A1 | 8/2009 | D'Hont et al. |
| 2009/0268652 A1 | 10/2009 | Kneckt et al. |
| 2010/0007521 A1* | 1/2010 | Cornwall ................ H04Q 9/00 340/870.02 |
| 2010/0026517 A1* | 2/2010 | Cumeralto ............. G01D 4/006 340/870.03 |
| 2010/0085954 A1 | 4/2010 | Keshavarzian |
| 2010/0097988 A1 | 4/2010 | Chung |
| 2010/0195552 A1 | 8/2010 | Ho |
| 2010/0329232 A1 | 12/2010 | Tubb et al. |
| 2011/0018762 A1 | 1/2011 | Walley et al. |
| 2011/0066297 A1 | 3/2011 | Saberi |
| 2011/0140909 A1 | 6/2011 | Olson et al. |
| 2011/0152970 A1 | 6/2011 | Jollota |
| 2011/0317019 A1* | 12/2011 | Bahl .................. H04L 27/0006 348/180 |
| 2012/0008536 A1 | 1/2012 | Tervahauta et al. |
| 2012/0026007 A1 | 2/2012 | Beattie |
| 2012/0115518 A1 | 5/2012 | Zeira |
| 2012/0201231 A1 | 8/2012 | Omeni |
| 2013/0007231 A1 | 1/2013 | Forssell |
| 2013/0064159 A1 | 3/2013 | Edwards |
| 2013/0083722 A1 | 4/2013 | Bhargava et al. |
| 2013/0094537 A1 | 4/2013 | Hui et al. |
| 2013/0107772 A1 | 5/2013 | Splitz et al. |
| 2013/0107999 A1 | 5/2013 | Mainaud et al. |
| 2013/0109319 A1 | 5/2013 | Splitz et al. |
| 2013/0155925 A1 | 6/2013 | Priyantha et al. |
| 2013/0181848 A1 | 7/2013 | Picard |
| 2013/0285855 A1 | 10/2013 | Dupray |
| 2013/0336245 A1 | 12/2013 | Fischer |
| 2014/0120962 A1 | 5/2014 | Merlin |
| 2014/0314003 A1 | 10/2014 | Zhou |
| 2014/0329498 A1 | 11/2014 | Cherian et al. |
| 2015/0003227 A1 | 1/2015 | Splitz |
| 2015/0006633 A1 | 1/2015 | Vandwalle et al. |
| 2015/0081814 A1 | 3/2015 | Turakhia |
| 2015/0103818 A1 | 4/2015 | Kuhn |
| 2015/0124698 A1 | 5/2015 | Jain et al. |
| 2015/0382283 A1 | 12/2015 | Wang et al. |
| 2016/0050689 A1 | 2/2016 | Fischer |
| 2016/0066249 A1 | 3/2016 | Dukes |
| 2016/0249378 A1 | 8/2016 | Zhou |
| 2016/0269971 A1 | 9/2016 | Kim et al. |
| 2016/0373940 A1 | 12/2016 | Splitz |
| 2017/0164307 A1 | 6/2017 | Zuniga et al. |
| 2017/0265153 A1 | 9/2017 | Grady |
| 2017/0303103 A1 | 10/2017 | Cullinan |
| 2018/0014248 A1 | 1/2018 | Splitz |

FOREIGN PATENT DOCUMENTS

| | | |
|---|---|---|
| WO | 2013062613 | 5/2013 |
| WO | 2016036475 | 3/2016 |

OTHER PUBLICATIONS

Splitz, David Edwin; Non-Final Office Action for U.S. Appl. No. 14/490,081, filed Sep. 18, 2014; dated Sep. 29, 2016; 34 pgs.

Dukes, Brent.; Issue Notification for U.S. Appl. No. 14/475,050, filed Sep. 2, 2014, dated Jan. 18, 2017, 1 pg.

Dukes, Brent; Notice of Allowability for U.S. Appl. No. 14/475,050, filed Sep. 2, 2014, dated Nov. 21, 2016, 33 pgs.

Dukes, Brent; Notice of Allowability for U.S. Appl. No. 14/475,050, filed Sep. 2, 2014, dated Dec. 15, 2016, 6 pgs.

Dukes, Brent; Notice of Allowance for U.S. Appl. No. 14/475,050, filed Sep. 2, 2014, dated Oct. 21, 2016, 15 pgs.

Dukes, Brent; International Preliminary Report on Patentability for PCT application No. PCT/US15/44140, filed Aug. 7, 2015, dated Mar. 16, 2017, 12 pgs.

Itron; Brochure for ChoiceConnect, Copyright 2013, 4 pgs.

Itron; Brochure for Radio Frequency Strategy in an AMI Deployment, Copyright 2012, 5 pgs.

Godwin, Angela; Article entitled: "Advanced Metering Infrastructure: Drivers and Benefits in the Water Industry", Waterworld, accessed on Mar. 30, 2016, 7 pgs.

Splitz, David Edwin; Issue Notification for U.S. Appl. No. 13/283,526, filed Oct. 27, 2011, dated Feb. 5, 2014, 1 pg.

Splitz, David Edwin; Non-Final Office Action for U.S. Appl. No. 13/283,526, filed Oct. 27, 2011, dated Jun. 18, 2013, 67 pgs.

Splitz, David Edwin; Notice of Allowance for U.S. Appl. No. 13/283,526, filed Oct. 27, 2011, dated Oct. 9, 2013, 16 pgs.

Splitz, David Edwin; Issue Notification for U.S. Appl. No. 13/339,655, filed Dec. 29, 2011, dated Sep. 17, 2014, 1 pg.

Splitz, David Edwin; Non-Final Office Action for U.S. Appl. No. 13/339,655, filed Dec. 29, 2011, dated Mar. 5, 2014, 18 pgs.

Splitz, David Edwin; Non-Final Office Action for U.S. Appl. No. 13/339,655, filed Dec. 29, 2011, dated Sep. 16, 2013, 57 pgs.

Splitz, David Edwin; Notice of Allowance for U.S. Appl. No. 13/339,655, filed Dec. 29, 2011, dated May 23, 2014, 41 pgs.

Dukes, Brent; Non-Final Office Action for U.S. Appl. No. 14/475,050, filed Sep. 2, 2014, dated May 19, 2016, 119 pgs.

Cullinan, Thomas; U.S. Patent Application entitled: SMS Communication for Cellular Node, having U.S. Appl. No. 15/098,986, filed Apr. 14, 2016.

Grady, Robert Henry; U.S. Patent Application entitled: Time Beacons having U.S. Appl. No. 15/065,423, filed Mar. 9, 2016.

Splitz, David; International Preliminary Report on Patentability for serial No. PCT/US11/58260, filed Oct. 28, 2011, dated May 8, 2014, 7 pgs.

Splitz, David; International Search Report and Written Opinion for serial No. PCT/US11/58260, filed Oct. 28, 2011, dated Feb. 7, 2012, 8 pgs.

Splitz, David; International Preliminary Report on Patentability for serial No. PCT/US12/22060, filed Jan. 20, 2012, dated May 8, 2014, 6 pgs.

Splitz, David; International Search Report and Written Opinion for serial No. PCT/US12/22060, filed Jan. 20, 2012, dated Mar. 29, 2012, 8 pgs.

(56) References Cited

OTHER PUBLICATIONS

Splitz, David Edwin; Extended European Search Report for serial No. 12844451.0, filed Jan. 20, 2012, dated Apr. 21, 2015, 8 pgs.
Dukes, Brent; International Search Report and Written Opinion for application No. PCT/US15/44140, filed Aug. 7, 2015, dated Dec. 30, 2015, 15 pgs.
Splitz, David Edwin; U.S. Provisional Patent Application entitled: Automatic Discovery of Nodes in a Mesh Network, U.S. Appl. No. 61/779,896, filed Mar. 13, 2013.
Splitz, David Edwin; U.S. Patent Application entitled: Asymmetrical Hail Timing, having U.S. Appl. No. 15/206,851, filed Jul. 11, 2016.
Cullinan,Thomas; Non-Final Office Action for U.S. Appl. No. 15/098,986, filed Apr. 14, 2016; dated Jul. 12, 2017; 23 pgs.
Splitz, David Edwin; Office Action for Canadian Patent Application No. 2,861,675, filed Oct. 28, 2011, dated Aug. 22, 2017, 4 pgs.
Grady, Robert Henry; Non-Final Office Action for U.S. Appl. No. 15/065,423, filed Mar. 9, 2016, dated Nov. 28, 2017, 45 pgs.
Splitz, David Edwin; Office Action for Canadian patent application No. 2,850,059, filed Mar. 25, 2014, dated Oct. 31, 2017, 3 pgs.
Splitz, David Edwin; Notice of Allowance for U.S. Appl. No. 14/490,081, filed Sep. 18, 2014, dated Mar. 2, 2018, 26 pgs.
Cullinan, Thomas; Final Office Action for U.S. Appl. No. 15/098,986, filed Apr. 14, 2016, dated Jan. 25, 2018, 22 pgs.
Splitz, David Edwin; Non-Final Office Action for U.S. Appl. No. 15/206,851, filed Jul. 11, 2016, dated Feb. 7, 2018, 53 pgs.
Splitz, David Edwin; Non-Final Office Action for U.S. Appl. No. 15/583,263, filed May 1, 2017, dated Mar. 8, 2018, 51 pgs.
Splitz, David Edwin; International Search Report for PCT Application No. PCT/US2017/050393, filed Sep. 7, 2017, dated Jan. 8, 2018, 14 pgs.
Cullinan, Thomas; Non-Final Office Action for U.S. Appl. No. 15/098,986, filed Apr. 14, 2016, dated Apr. 5, 2018, 11 pgs.
Grady, Robert Henry; Notice of Allowance for U.S. Appl. No. 15/065,423, filed Mar. 9, 2016, dated Apr. 12, 2018, 15 pgs.
Splitz, David Edwin; Office Action for Canadian application No. 2,861,675, filed Mar. 25, 2014, dated Apr. 12, 2018, 4 pgs.
Splitz, David Edwin; Office Action for Canadian patent application No. 2,850,059, filed Mar. 25, 2014, dated Apr. 23, 2018, 3 pgs.
Splitz, David Edwin; Issue Notification for U.S. Appl. No. 14/490,081, filed Sep. 19, 2014, dated Jul. 11, 2018, 1 pg.
Berg et al., Spread Spectrum in Mobile Communication, 1998, The Institution of Electrical Engineers, ISBN 085296935X, pp. 42-132 (Year 1998).
Splitz, David Edwin; Final Office Action for U.S. Appl. No. 15/206,851, filed Jul. 11, 2016, dated Jul. 20, 2018, 25 pgs.
Splitz, David Edwin; Corrected Notice of Allowability for U.S. Appl. No. 14/490,081, filed Sep. 18, 2014, dated Jun. 26, 2018, 8 pgs.

* cited by examiner

NODE MIGRATION

TECHNICAL FIELD

This disclosure relates to socio-technical networks. More specifically, this disclosure relates to two-way communication with a node that would allow its use in a network exhibiting characteristics of two different network types.

BACKGROUND

A utility provider, such as a gas, electricity, or water provider, may have a large number of control, measuring, and sensing devices installed in the field in order to control transmission and distribution of the product, measure, and record product usage, and detect problems. Such devices may include water, gas, or electrical meters, remotely controlled valves, flow sensors, leak detection devices, and the like. Utility meters may include or be connected to wireless communication devices (nodes) that communicate through wireless communications with other communication devices to effect remote meter reading.

A traditional Advanced Meter Reading (AMR) system allows for only one-way communication between a node and another network device, such as a mobile ("drive-by") collector. The node periodically emits a signal (herein also referred to as an "AMR beacon") containing information identifying the node as well as a usage reading detected by the node. The node in a conventional AMR system does not receive any communication from any device.

AMR networks evolved into Advanced Metering Infrastructure (AMI) networks, which are characterized by two-way communication between a node and another network device or devices. In a typical, fixed AMI configuration, an AMI system may comprise a central host capable of connecting via wired and/or wireless networking infrastructures to a number of communication nodes, each node providing network communications for one or more connected metering devices, control devices, sensor devices, or the like. The AMI system may further include data collection hubs, repeaters, gateways, and the like. Despite the advantages presented by AMI networks over AMR networks (such as robustness), many utility providers continue to use AMR networks because the costs of completely replacing an AMR network with an AMI network are significant. It would be desirable to have a system that is more easily migrated from AMR to AMI.

SUMMARY

Disclosed are a system and method that periodically send an AMR beacon from a node at a first regular time interval, the AMR beacon containing a register identification and a reading detected by the node, and periodically listen, at the node, for a communication such that instances of listening occur at a second regular time interval preferably smaller than the first time interval, thereby facilitating efficient migration from AMR to AMI.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

Figure 1:
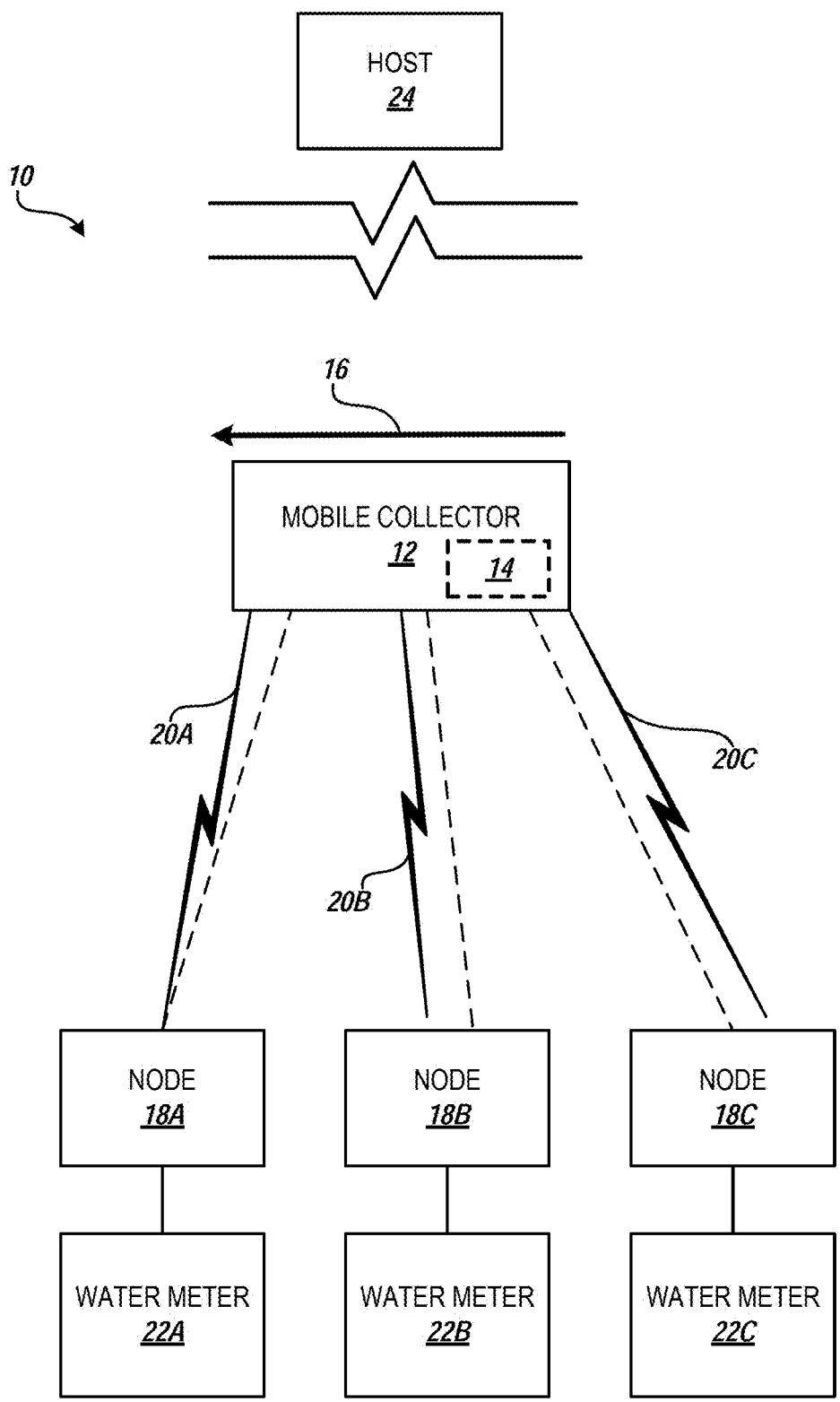
FIG. 1 is a block diagram showing one example of a modified AMR network topology, according to embodiments described herein.

The present disclosure can be understood more readily by reference to the following detailed description, examples, drawing, and claims, and their previous and following description. However, before the present devices, systems, and/or methods are disclosed and described, it is to be understood that this disclosure is not limited to the specific devices, systems, and/or methods disclosed unless otherwise specified, as such can, of course, vary. It is also to be understood that the terminology used herein is for the purpose of describing particular aspects only and is not intended to be limiting.

The following description is provided as an enabling teaching in its best, currently known embodiments. To this end, those skilled in the relevant art will recognize and appreciate that many changes can be made to the various disclosed aspects described herein, while still obtaining the beneficial results of the present disclosure. It will also be apparent that some of the desired benefits can be obtained by selecting some of the features without utilizing or including other features. Accordingly, those who work in the art will recognize that many modifications and adaptations are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "a panel" can include two or more such panels unless the context indicates otherwise. As used herein, the terms "optional" or "optionally" mean that the subsequently described event or circumstance may or may not occur, and that the description comprises instances where said event or circumstance occurs and instances where it does not.

Ranges can be expressed herein as from "about" one particular value, and/or to "about" another particular value. When such a range is expressed, another aspect comprises from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. For purposes of the current disclosure, a material property or dimension measuring about X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

FIG. 1 is a block diagram showing one example of a topology of a portion of a modified AMR network 10. "Modified" AMR as used herein indicates a difference from conventional AMR networks in that the network 10 permits limited two-way communication with a node that not only sends AMR beacons, but that also listens for communications that may come from a stationary AMI device as well as from a mobile collector typically used in AMR networks, as will be explained herein. Network 10 includes a mobile ("drive-by") collector 12 having a transceiver 14 moving in a direction such as shown by arrow 16, the movement provided by a motorized vehicle (not shown) on which the mobile collector 12 may be mounted or carried. The mobile collector 12 passes in sufficient proximity to nodes 18A, 18B,18C (referred to herein generally as nodes 18) to allow wireless communication between the nodes 18 and the collector 12 through various communication links 20A,20B, 20C (referred to herein generally as communication links 20). The communication links 20 may include wireless communication links, such as radio frequency ("RF") communication links. The transceiver 14 of the mobile collector 12, together with a transceiver housed in each of the nodes (see FIG. 4), primarily provide for one-way transmissions from the nodes 18 to the collector 12. However, since it is occasionally desirable to communicate with a node 18 from a collector, such as to obtain additional data, this modified AMR system allows for two-way communication between the mobile collector 12 and the nodes 18. Thus the mobile collector 12 may send mobile commands across the communication links 20 to the nodes 18, as disclosed further with regard to FIG. 5. The mobile collector 12 may periodically collect usage data, sensor data, and other data from the nodes 18 (including, for example, more detailed usage data from water meters 22A,22B,22C) and forward data to a host 24, separated from the remainder of the elements of the network 10 by broken lines to indicate that the host 24 is housed in a location remote from mobile collector 12 when the mobile collector 12 is in transit collecting the data from the nodes 18. The host 24 may represent a combination of application servers, database servers, communication servers, web servers, and the like that comprise the systems of the utility provider used to collect data from, control, and manage the various communication nodes 18. When the mobile collector 12 completes its collection of data from the nodes 18, the mobile collector 12 is brought into sufficient proximity with the host 24 to permit transfer of collected data to the host 24 via any suitable data connection, such as with cables or wireless devices (not shown). Nodes 18A, 18B,18C may be connected to water, gas, or electrical meters, remotely controlled valves, flow sensors, leak detection devices, and the like (such as, respectively, water meters 22A,22B,22C). It will be appreciated that the term "node" as used herein may refer to either a composite device in a network capable of performing a specific function or a communication module connected to such a device and configured to provide communications for the device with the mobile collector 12. Any one of the nodes 18 sends an AMR beacon containing a register identification (ID) and a reading detected by the node. For example, if one of the nodes 18 is part of, or connected to, a water meter, then the AMR beacon includes a register ID and data representative of a reading of the water meter.

Figure 2:
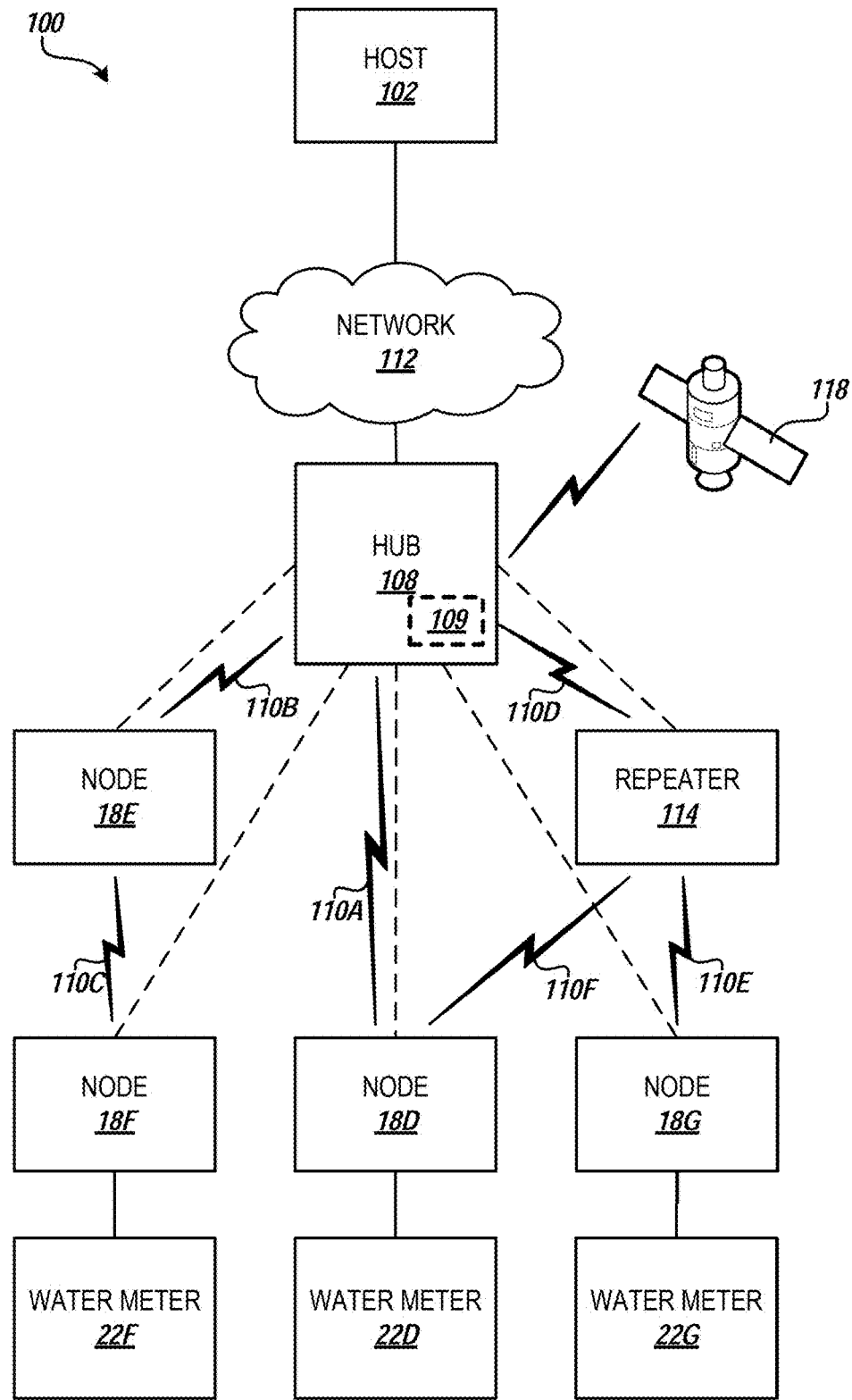
FIG. 2 is a block diagram showing one example of an AMI network topology, according to embodiments described herein.

FIG. 2 is a block diagram showing one example of a network topology of an illustrative fixed AMI system 100, such as that implemented by a utility provider. The AMI system 100 may include utility provider systems, such as host 102. The host 102 may represent a combination of application servers, database servers, communication servers, web servers, and the like that comprise the systems of the utility provider used to collect data from, control, and manage the various nodes 18D-18G (referred to herein generally as nodes 18) in the AMI system 100. For example, as shown in FIG. 2, nodes 18F,18D,18G may be respectively connected to water meters 22F,22D,22G and provide AMI network communication for the device.

According to various embodiments, the host 102 may communicate with the nodes 18 through one or more stationary collection hubs 108. The stationary, or fixed, collection hubs 108 may comprise specialized network nodes installed in the field that act as a "parent node" for a set of assigned child nodes 18D-18G that communicate with the hub through various communication links 110A-110E (referred to herein generally as communication links 110). The communication links 110 may include wireless communication links, such as RF communication links. Owing to a stationary transceiver 109 housed in each hub 108, the communication across the communication links 110 is two-way. The collection hubs 108 may periodically collect usage data, sensor data, and other data from the child nodes 18 and forward data to the host 102 over a network 112. The collection hubs 108 may also forward messages received from the host 102 over the network 112 to the target child node(s) 18. The network 112 may comprise various networking technologies that connect the collection hubs 108 in the field to the host 102, including cellular data networks, Wi-Fi or WiMAX networks, satellite communication networks, metropolitan-area networks ("MANs"), wide-area networks ("WANs"), the Internet, and the like.

A collection hub 108 may communicate with its child nodes 18D-18G either directly or through one or more intermediary devices. For example, the AMI system 100 may include repeaters 114 that facilitate communication between the collection hub 108 and remote nodes, such as node 18G. According to further embodiments, some nodes may be configured to act as repeaters, referred to herein as "buddy nodes," such as node 18E shown in FIG. 2. It will be appreciated that some nodes in the AMI system 100, such as node 18D, may be located such that it receives messages from the collection hub 108 both directly and by way of one or more repeaters 114 or buddy nodes.

According to embodiments, the collection hubs 108 may include or be connected to an accurate time source 118. For example, a collection hub 108 may be GPS-enabled and able to receive a highly accurate time value from a GPS receiver. Other accurate time sources 118 may include a cellular network connection, an integrated accurate real-time clock component, and the like. Because collection hubs 108 may be connected to fixed power sources, these devices may be able to maintain accurate current time without the need for reduced power consumption required by other, remote nodes, such as node 18G. It will be appreciated that the configuration of the network comprising the AMI system shown in FIG. 1 and described above is merely one configuration, and additional devices and/or alternative configurations may be conceived by one skilled in the art. As such, the network topology shown in FIG. 1 and the network configurations described should not be seen as limiting but, instead, as merely exemplary.

The communication links shown in FIGS. 1 and 2 represent a network or networks that may comprise hardware components and computers interconnected by communications channels that enable sharing of resources and information. The network may comprise one or more of a wired, wireless, fiber optic, or remote connection via a telecommunication link, an infrared link, a radio frequency link, a cellular link, a Bluetooth® link, or any other suitable connectors or systems that provide electronic communication. The network may comprise intermediate proxies, routers, switches, load balancers, and the like. The paths followed by the network between the devices as depicted in FIGS. 1 and 2 represent the logical communication links between a node and a mobile collector 12 (FIG. 1), and a node and a hub (FIG. 2), not necessarily the physical paths or links between and among the devices.

Figure 3:
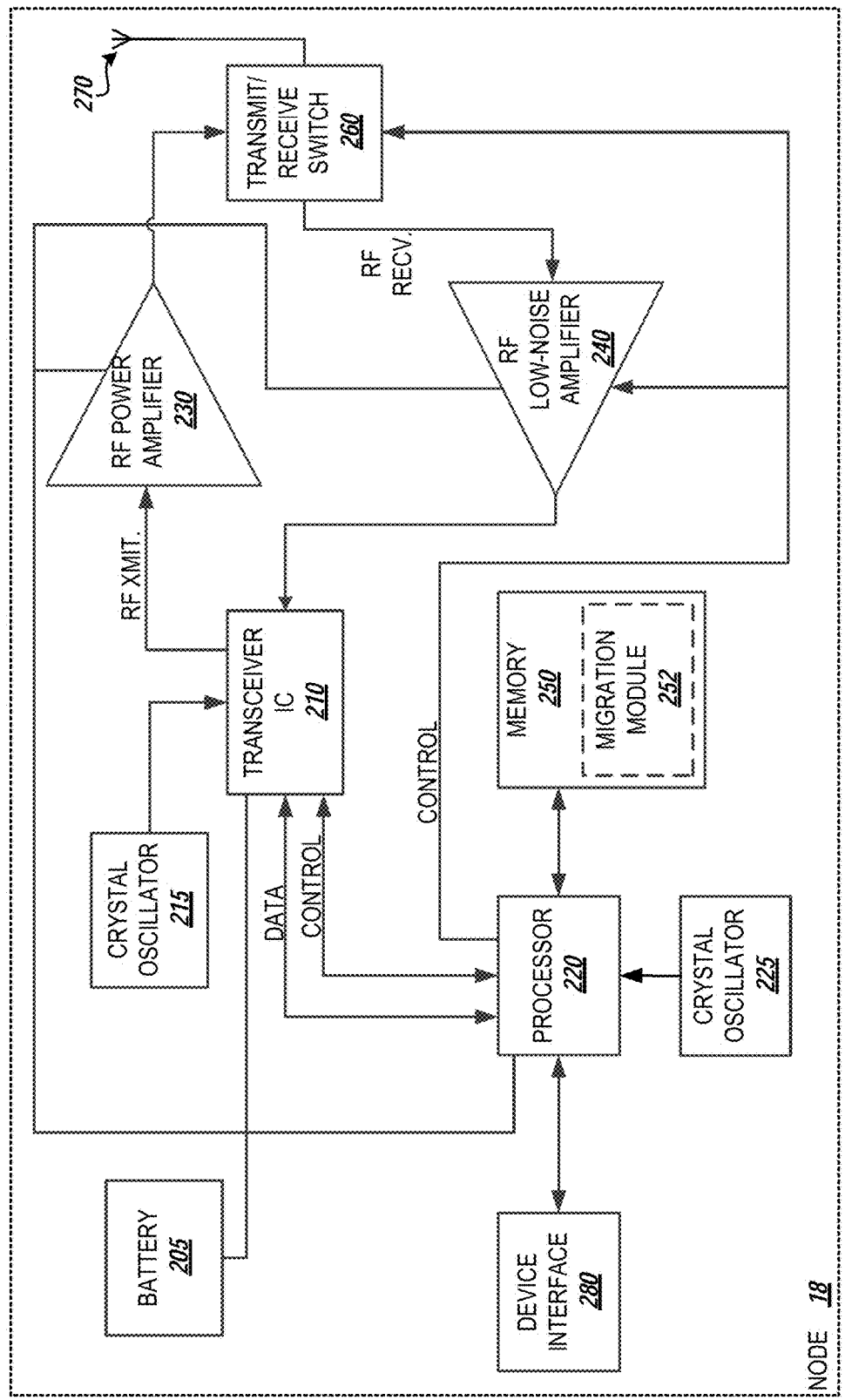
FIG. 3 is a block diagram of a node according to certain embodiments described herein.

FIG. 3 shows a block diagram of components of an illustrative node 18 configured for RF communication in AMR and AMI networks. In other words, the node 18 is able to operate in an AMI mode or in a modified AMR mode. The node 18 may allow data to and from devices in the AMI system 100, such as water, gas, or electrical meters, remotely controlled valves, flow sensors, leak detection devices, collection hubs 108, repeaters 114, and the like, to be communicated over the wireless AMI network. For example, the node 18 may be implemented in or connected to water meters (as in FIGS. 1 and 2) or to a leak detection device in order to transmit audio recording data to the host 102 for leak detection. According to various embodiments, the node 18 may be configured for communication on various radio network topologies, including star, hybrid-star, peer-to-peer, mesh, and the like.

The node 18 may include a battery 205 that powers a transceiver integrated circuit ("IC") 210, a processor 220, an RF power amplifier 230, an RF low-noise amplifier 240, a memory 250, and other components. Crystal oscillators 215 and 225 are connected to the transceiver IC 210 and the processor 220, respectively. The node 18 further includes a transmit/receive switch 260 and antenna 270. The processor 220 may be a microprocessor, a microcontroller, a field-programmable gate array ("FPGA"), or the like. The processor 220 and the transceiver IC 210 may include both a two-way data and a two-way control line. In some embodiments, the processor 220 includes a control line to each of the RF low-noise amplifier 240 and the transmit/receive switch 260. The processor 220 may also be connected to the memory 250 by a two-way data line.

The memory 250 may comprise a processor-readable storage medium for storing processor-executable instructions, data structures and other information. The memory 250 may include a non-volatile memory, such as read-only memory ("ROM") and/or FLASH memory, and a random-access memory ("RAM"), such as dynamic random access memory ("DRAM") or synchronous dynamic random access memory ("SDRAM"). The memory 250 may store firmware that comprises commands and data necessary for the nodes 18, collection hubs 108, and repeaters 114 to communicate with other devices in the AMI system 100 as well as perform other operations of the nodes. According to some embodiments, the memory 250 may store a migration module 252 comprising processor-executable instructions that, when executed by the processor 220, perform at least portions of the routine 600 (including the method at block 604) for controlling AMR beacons and migrating the node 18 from a modified AMR mode to an AMI mode.

In addition to the memory 250, the node 18 may have access to other processor-readable media storing program modules, data structures, and other data described herein for accomplishing the described functions. It will be appreciated by those skilled in the art that processor-readable media can be any available media that may be accessed by the processor 220 or other computing system, including processor-readable storage media and communications media. Communications media includes transitory signals. Processor-readable storage media includes volatile and non-volatile, removable and non-removable storage media implemented in any method or technology for the non-transitory storage of information. For example, processor-readable storage media includes, but is not limited to, RAM, ROM, erasable programmable ROM ("EPROM"), electrically-erasable programmable ROM ("EEPROM"), FLASH memory or other solid-state memory technology, compact disc ROM ("CD-ROM"), digital versatile disk ("DVD"), high definition DVD ("HD-DVD"), BLU-RAY or other optical storage, magnetic cassettes, magnetic tape, magnetic disk storage or other magnetic storage devices and the like.

According to embodiments, the processor 220 may be further connected to other components of the node 18 through a device interface 280. In some embodiments, the device interface 280 may connect to a metering component, such as a water, gas, or electricity meter, that allows the meter to provide usage data to the host 102 through the AMI system 100. In further embodiments, the device interface 280 may connect to sensors or detection components. In still further embodiments, the device interface 280 may connect to a control component, such as an electronically actuated water valve, that allows the host 102 and/or other devices in the AMI system 100 to control aspects of the utility provider's infrastructure. These examples are not meant to be limiting, and those of skill in the art will recognize that alternative device components that may be interfaced with the node 18 through the device interface 280. For example, the device interface 280 may connect to a control component (valve actuator) and a data reading port (water meter readings) at the same time.

It will be appreciated that the structure and/or functionality of the node 18 may be different than that illustrated in FIG. 3 and described herein. For example, the transceiver IC 210, processor 220, RF power amplifier 230, RF low-noise amplifier 240, memory 250, crystal oscillators 215, 225, device interface 280 and other components and circuitry of the node 18 may be integrated within a common integrated circuit package or distributed among multiple integrated circuit packages. Similarly, the illustrated connection pathways are provided for purposes of illustration and not of limitation, and some components and/or interconnections may be omitted for purposes of clarity. It will be further appreciated that the node 18 may not include all of the components shown in FIG. 3, may include other components that are not explicitly shown in FIG. 3 or may utilize an architecture completely different than that shown in FIG. 3.

Figure 4:
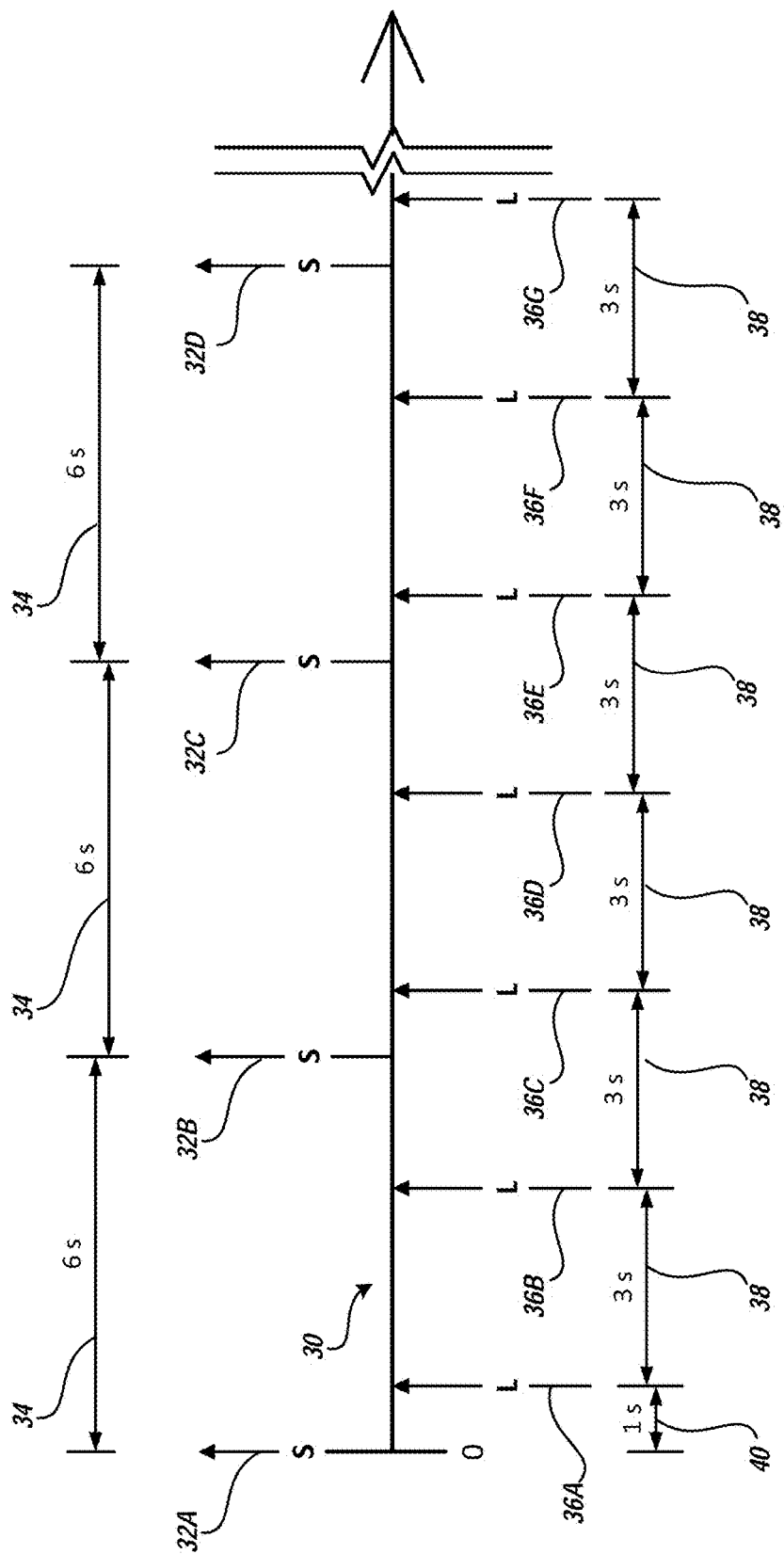
FIG. 4 is a timing diagram showing example timing of both periodic sending of an AMR beacon from a node and periodic listening by the node for a communication.

Referring to FIG. 4, showing a timeline 30, each node 18 sends AMR beacons such as at 32A-32D (arrows also designated by the letter "S," for "send"; AMR beacons referred to collectively as "AMR beacons 32") periodically, meaning that the AMR beacons 32 repeatedly occur at a regular time interval 34, an example of such an interval 34 being in the range of 1 to 30 seconds, such as the six seconds shown in FIG. 4. In one implementation, the nodes 18 repeatedly send the AMR beacons 32 at a power of about 15 dBm, and at a frequency of about 915 MHz. Each node 18 also periodically listens for a communication, such as a hailing message from the mobile collector 12 (see FIG. 1) or stationary collector or hub 108 (see FIG. 2), meaning that instances of listening, such as at 36A-36G (collectively referred to herein as listening instances 36, shown by arrows designated with the letter "L" for "listening"), preferably occur at a regular time interval 38 smaller than the regular time interval 34. An example of regular time interval 38 is in the range of 0.5 to 30 seconds, such as the three seconds as shown in FIG. 4. The initial instance of listening 36A occurs after the initial AMR beacon 32A, the initial instance 36A being separated from the initial AMR beacon 32A by an offset 40, which may have a magnitude in the range of 0.2 to 10 seconds, such as the one second shown in FIG. 4. In the shown embodiment, similar timing and similar messaging protocols are utilized for signals from stationary and mobile collectors, thereby reducing complexity and preserving battery life. However, other embodiments include different timing and communication protocols for mobile and stationary communications with the nodes 18.

In some embodiments, nodes 18 in the networks illustrated in FIGS. 1 and 2 may employ frequency-hopping spread spectrum ("FHSS") technology to transmit and receive data between them. For example, the nodes 18 may be configured to comply with F.C.C. rules and regulations (part 15) (47 C.F.R. § 15). FHSS is a method of transmitting and receiving radio signals by rapidly switching among many frequency channels using a pseudorandom channel sequence known to both the transmitting and receiving devices. In some embodiments, hailing channels and data channels are selected from the 902-928 MHz industrial, scientific, and medical ("ISM") bandwidth. Battery-powered (DC) nodes of the type illustrated in FIG. 3 may not be able to afford to expend the energy to continuously monitor as many as 50 FHSS channels, so between 1 and 20, such as 16, non-FHSS channels may be reserved for hailing of battery-powered nodes 18. In some examples, the 16 non-FHSS channels may be 500 kHz wide channels. Each battery-powered node 18 may be assigned two (a set) of these non-FHSS channels to monitor for incoming hailing messages. In other implementations there may only be one hailing channel and in still other implementations, there may be more than 2 hailing channels, in which case the alternating would simply rotate through all hailing channels successively. Thus, nodes 18 performing listening instances 36 through, in some implementations, a channel activity detection process that includes listening for a hailing message during a hailing listening period, or instance, on the set of the plurality of non-FHSS channels. In examples, nodes 18 may utilize an RF chipset (for example, Semtech's LoRa RF chipset for transceiver IC 210 and other elements, as controlled by programming in memory 250), which may include an integrated or connected channel activity detector (CAD). The CAD can quickly assess whether any RF energy exists in a channel that matches a preamble transmission profile. A preamble represents a sequence of symbols that may be repeated at the start of a data message, including a hailing message. A preamble may precede any valid messages, including hailing messages. The preamble can be detected and decoded, enabling, for example, a receiving node 18 to distinguish between a valid, intended message and other data (e.g., noise, data intended for other devices, data from another network, etc.). In an example, the preamble may represent a known sequence of symbols that may be, for example, six (6) symbols, although other numbers of symbols are also possible and may be utilized in various implementations.

If the CAD detects the possibility of an incoming message as a result of detecting energy in a channel that matches the preamble transmission profile, the chipset enters a mode to receive the data preceded by the preamble. Such detection may be referred to as "performing a CAD" or "completing a CAD." In performing a CAD, the channel activity detector looks at one symbol at a time and verifies if the RF signature matches a preamble. If such a match occurs after detection of one symbol, the channel activity detector looks at between 3 and 10 more preamble symbols (such as five (5) more preamble symbols) for verification that the matter being detected is, in fact, a preamble. It may take a total of about 3 ms to complete a CAD on both of the monitored channels, one after the other, as a CAD can be completed upon detection of, for example, six (6) preamble symbols. Devices hailing on the non-FHSS channels use a message with approximately 160 ms of preamble, in one implementation. The hail message is repeated several times until a receiving node 18 detects and acknowledges the hail from a hailing device, as explained further below. In other words, the repeating of the hail message only occurs so long as a device hailing the receiving node 18 did not receive an acknowledgement from the receiving node.

Figure 5:
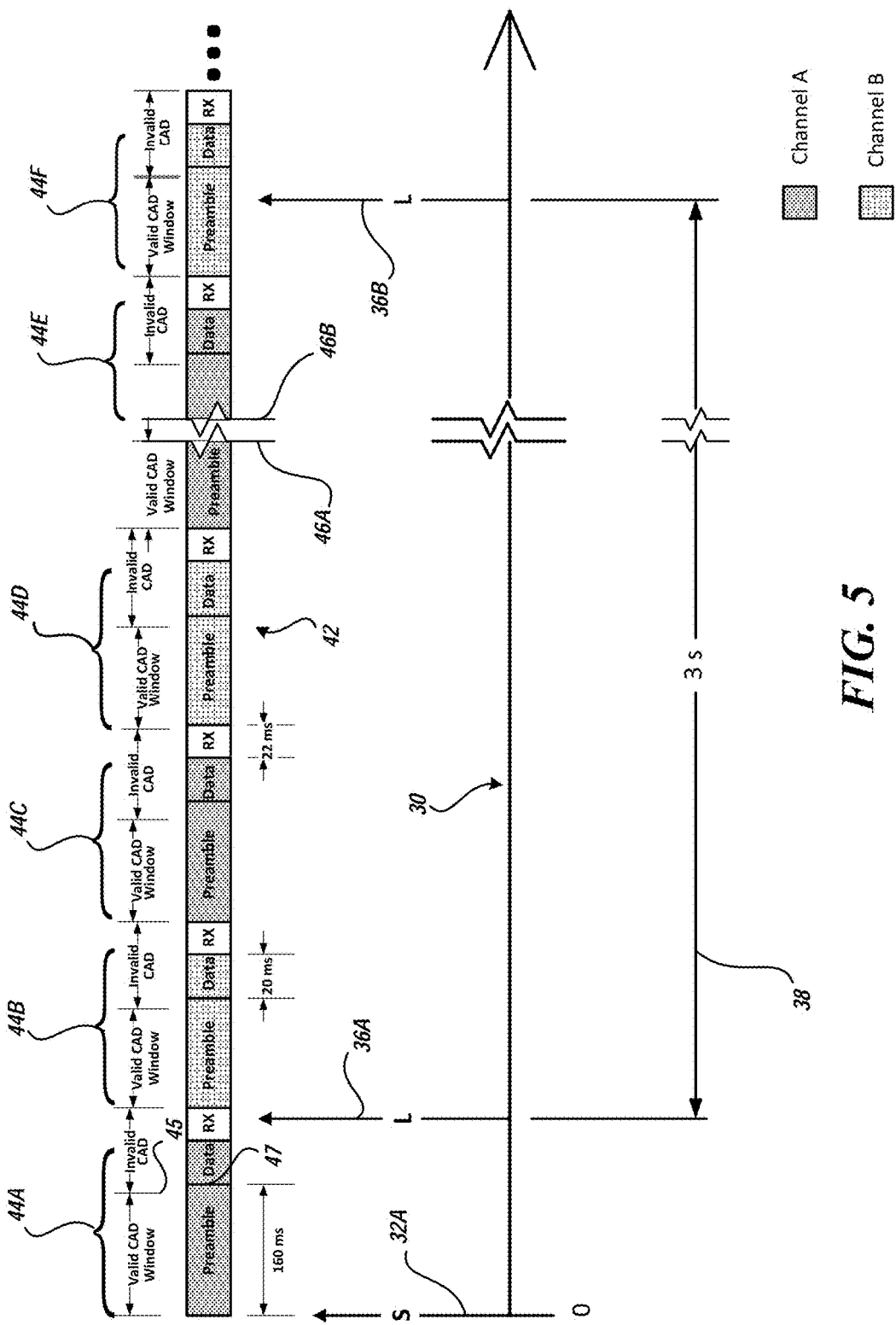
FIG. 5 is a composite timing diagram enlarging a portion of the periodic listening diagram illustrated in FIG. 4, and juxtaposing that portion with a hailing pattern timing diagram of messages being sent alternately between two hailing channels of the node.

In examples such as that previously described with regard to FIG. 4, a battery-powered node 18 samples for incoming messages at a relatively slow rate. Referring to FIG. 5, in order to successfully hail a battery-powered node 18, a repeating pattern of hail messages is sent. An example of a source of hail messages is a hailing device (such as hub 108 or repeater 114 in FIG. 2). FIG. 5 juxtaposes an enlarged portion of the periodic listening diagram shown in FIG. 4 with a hailing pattern timing diagram 42 of messages being sent alternately between two hailing channels (shown as Channel A and Channel B) of a node 18. With the enlargement resulting in FIG. 5, the instances of listening 36A and 36B are isolated from the remaining listening instances shown in FIG. 4, and initial AMR beacon 32A is isolated from the remaining AMR beacons 32B-32D shown in FIG. 4. Additionally, the instances of listening 36A and 36B have been moved above the timeline 30 alongside the initial AMR beacon 32A, for clarity of illustration in relation to the hailing pattern timing diagram 42, described below.

FIG. 5 shows a hailing pattern timing diagram 42 representing a pattern, or sequence, of hail messages 44A-44F (collectively referred to herein as hail messages 44) from a hailing device, such as the hub 108 and, more particularly, such as from stationary transceiver 109 (FIG. 2) within hub 108. Each hail message 44 may include, in one implementation, approximately 160 ms of preamble and 20 ms of data, for a hail duration of approximately 180 ms, or 0.18 s. Thus, the three-second period 38 spanning each listening instance 36 is between sixteen and seventeen times larger than the hail duration, since 3 divided by 0.18 is about 16.67. Each hail message 44 is followed by a period "RX" of approximately 22 ms where the hailing device tries to receive the response (acknowledgement, or "ACK signal") from a receiving node (also called a "target node" and exemplified at node 18F, 18D, and 18G in FIG. 2) on an FHSS channel referenced in the hail message 44. FIG. 5 does not show the entirety of the preamble period of hail message 44E since break line segments 46A,46B interrupt it (though they could have been located anywhere along the length of the diagram 42) to indicate that more hail messages are present in the hail pattern during the 3-second regular time interval 38 than are actually shown in FIG. 5. In examples, such as the hailing pattern timing diagram 42 illustrated in FIG. 5, the hail messages are sent alternating between two hailing channels of the receiving node 18 (target node). As shown in FIG. 5, hail messages 44A, 44C, and 44E are sent on Channel "A," and hail messages 44B, 44D, and 44F are sent on Channel "B."

FIG. 5 indicates which portions of each hail message 44 are valid and invalid, for purposes of being able to detect a hail message. A receiving node 18 can only detect a hail message during the preamble period except for the last few milliseconds thereof, as shown in FIG. 5. Detection of a hail message cannot occur when the hailing device is transmitting data or when it is waiting for the acknowledgement signal from the receiving node 18; thus, for each hail message 44, the "Invalid CAD" periods in FIG. 5 are each shown extending across an "RX" period, across a "Data" period, and extending slightly into the end of each preamble period, which shown by dimension line segments such as at 45. Line segment 45 is intended to show that, in one implementation, a CAD cannot be completed for the last five (5) preamble symbols appearing within the 160 ms preamble period of a hail message 44, since usually detection of at least six (6) preamble symbols is required for CAD completion. A start frame 47 separates the preamble portion of a hail message from the data portion. The start frame 47 indicates that the next matter to be transmitted is going to be data and not preamble symbols.

In one implementation, the detection of hail messages in the manner discussed with regard to FIGS. 4 and 5 is the same regardless of whether the hail message was sent by a mobile collector 12 in a modified AMR network or by a fixed AMI network device such as hub 108. The timing of the hail messages 44 and gap between instances of listening is such that if an instance of listening falls within an invalid period for one hail message, a next instance of listening will fall within a valid time period for a later hail message, enabling a successful hail. For example, FIG. 5 shows that initial instance of listening 36A may fall within an invalid period, such as an RX period following hail message 44A, when the hailing device awaits an acknowledgement from the receiving node 18. Three seconds later, however, the next instance of listening 36B falls within a valid CAD window of hail message 44F.

Embodiments of the methods and systems are described below with reference to block diagrams and flowchart illustrations of methods, systems, and apparatuses. It will be understood that each block of the block diagrams and flowchart illustrations, and combinations of blocks in the block diagrams and flowchart illustrations, respectively, can be implemented by program instructions. These program instructions may be programmed into programmable processing elements to produce logic that executes on the processing elements to create means for implementing the functions specified in the flowchart block or blocks, which describe and reference specific algorithms and inherent structure for accomplishing the functions as described and further explained herein.

These program instructions may also be stored in a processor-readable memory that can direct a processing apparatus to function in a particular manner, such that the instructions stored in the processor-readable memory produce an article of manufacture including processor-readable instructions for implementing the function specified in the flowchart block or blocks. The program instructions may also be loaded onto a processing apparatus to cause a series of operational steps to be performed on the programmable apparatus to produce a processor-implemented process such that the instructions that execute on the programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based systems that perform the specified functions or steps, or combinations of special purpose hardware and instructions.

It is contemplated that the processor of the present application can operate in a networked environment using logical connections to one or more remote devices. By way of example, a remote device can be a personal computer, portable computer, a server, a router, a network computer, a peer device or other common network node, and so on. Logical connections between the processor and a remote computing device can be made via a local area network and a general wide area network. Such network connections can be through a network adapter. It is further contemplated that such a network adapter can be implemented in both wired and wireless environments, which are conventional and commonplace in offices, enterprise-wide computer networks, intranets, and the Internet.

It is recognized that programs and components reside at various times in different storage components of a device. Any of the disclosed methods can be performed by processor readable instructions embodied on processor-readable media. Such media can be any available media that can be accessed by a processor. By way of example and not meant to be limiting, processor readable media can comprise volatile and non-volatile, removable and non-removable media implemented in any methods or technology for storage of information.

Figure 6:
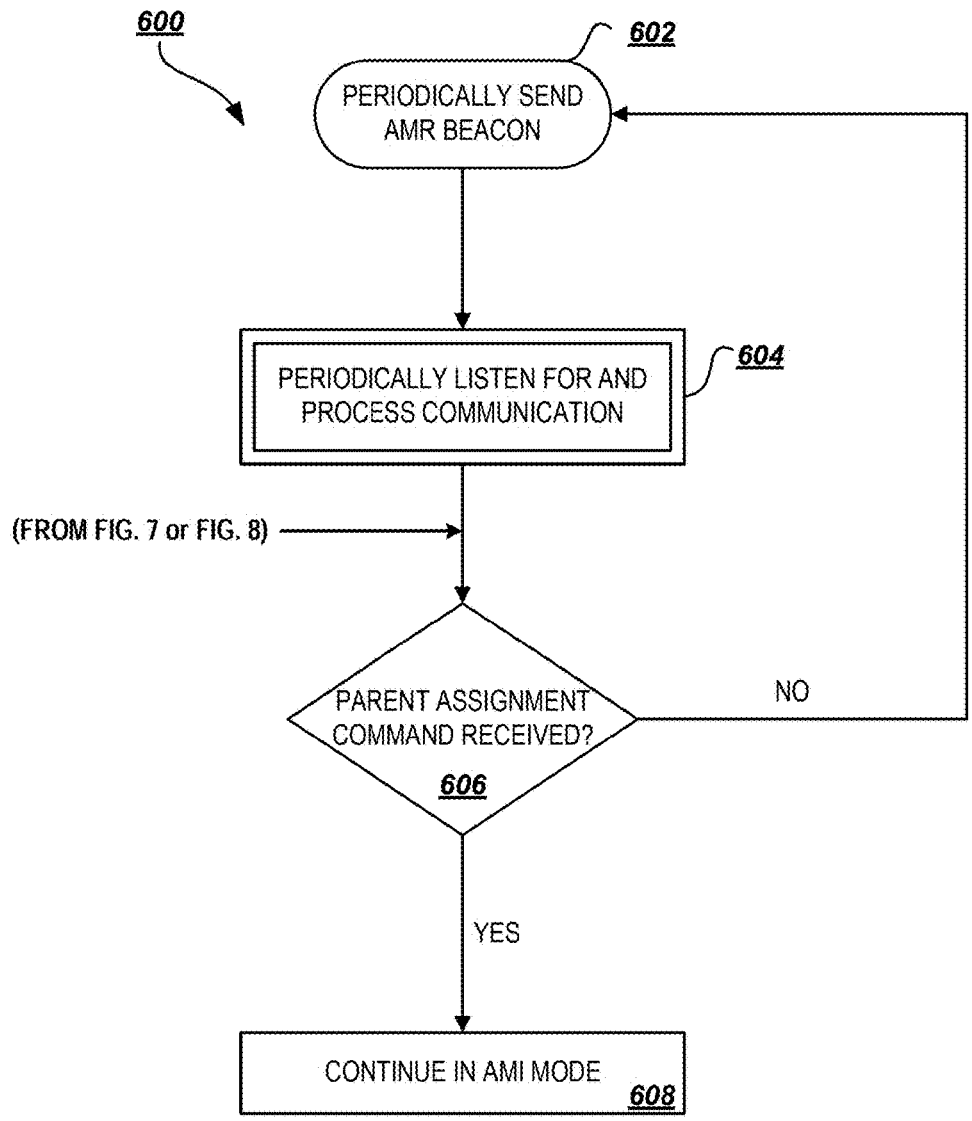
FIG. 6 illustrates a flow diagram of an exemplary method showing steps that can be taken in a transition of a node from a modified AMR mode to an AMI mode.

FIG. 6 illustrates a flow diagram of a method 600 showing steps that can be taken in a transition of a single node 18 from a modified AMR mode to an AMI mode. Method 600 begins at block 602, where the node 18 periodically sends its AMR beacon, in the manner discussed with regard to FIGS. 4 and 5. At block 604, the node 18 periodically listens for a communication, in the manner discussed with regard to FIGS. 4 and 5. Also at block 604, the node 18 processes the communication in the manner detailed below with regard to FIGS. 7 and 8, and the double border of block 604 signifies that it includes subsidiary processing steps, as disclosed in those figures. The listening step of block 604 is shown for purposes of illustration to sequentially follow the beacon sending step of block 602 since, referring to FIG. 4, the initial AMR beacon 32A precedes the initial instance of listening 36A (by the offset 40). It is to be understood, however, that despite the sequential representation of blocks 602 and 604 in FIG. 6, and consistent with the above discussion of FIG. 4, multiple instances of listening may be represented by step 604 and precede the next AMR beacons. For instance, in FIG. 4, the first two instances of listening 36A,36B precede the next AMR beacon 32B. In addition, because of the sequential processing represented in FIG. 4, extended time may be spent in block 604 that will delay AMR beacon such that the periodicity of the beacons is delayed or ceased entirely, as is represented by step 608. However, before proceeding in detail to the remaining blocks of method 600, discussion of the communication processing steps of FIGS. 7 and 8 is useful.

Figure 7:
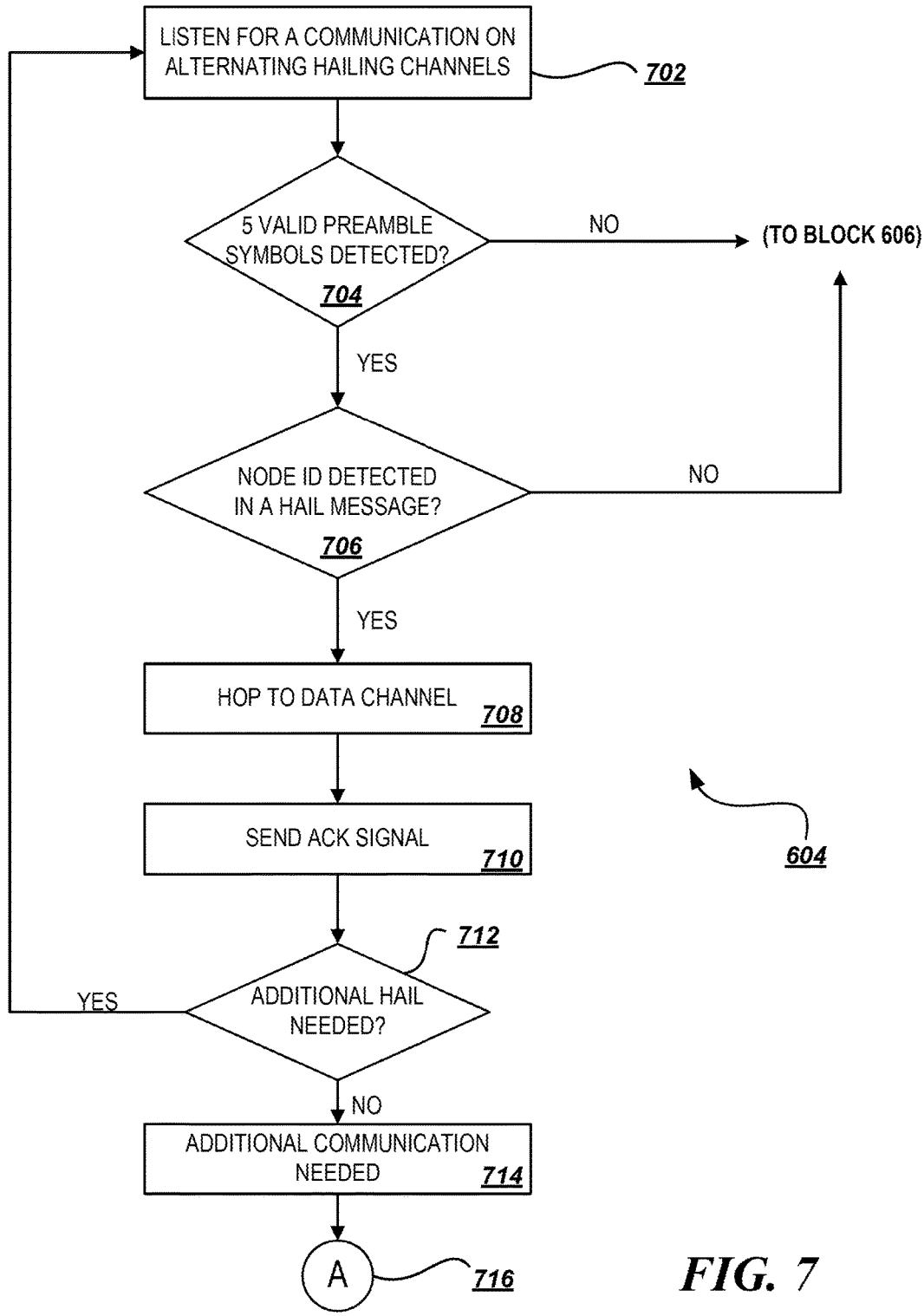
FIGS. 7 and 8 illustrate a flow diagram of an exemplary method to implement the "periodically listen for and process communication" step (block 604) of FIG. 6.

FIG. 7 illustrates the first sequence of blocks describing the communication processing method represented by block 604 of FIG. 6. At block 702, a receiving node 18 listens for a communication (here, a hail message) on a pair of alternating hailing channels in the manner discussed with regard to FIGS. 4 and 5. At decision block 704, it is determined whether, in this particular implementation, five valid (consecutive) preamble symbols have been detected. If no such detection occurs, then the method of block 604 proceeds directly to block 606 of FIG. 6. Since no hailing message was received, no data could be received, such as a parent assignment command, resulting in the process continuing in block 602 and the modified AMR mode continuing. If, however, the receiving node 18 successfully detects five consecutive preamble symbols, i.e., valid channel activity is detected (which can happen in other ways in other embodiments), which suggests a hail message may be available in a subsequent data window, the method advances to decision block 706. In the present implementation, the sending of the AMR beacons has effectively been suspended because communication processing continues in the method of block 604. No AMR beacons are sent until and unless method 600 (FIG. 6) reaches the "NO" line running from block 606 to block 602. In other implementations, suspension of AMR beacons may happen in other ways, i.e., a flag or some sort of inter process communication that actively suspends an otherwise independent beaconing thread. In decision block 706, it is determined whether data received after the preamble symbols includes a hail message containing the node ID of the receiving node 18. Other implementations include other methods of determining if a hailing message is valid for the node 18, including other implementations of directed hailing messages as well as broadcast messages that are not directed to any particular node 18. If no hailing message to be acted upon by the node 18 is detected, then the method of block 604 again goes directly to block 606 of FIG. 6. If, however, the receiving node 18 detects its node ID in the hail message, then the method of block 604 advances to block 708, where the receiving node 18 hops from the hailing channel, on which it received the hail message, to a data channel identified in the hail message. The method of block 604 then reaches block 710, where the receiving node 18 sends an ACK signal to the hailing device over the data channel to which the node 18 hopped at block 708. At decision block 712 it is determined whether stable two-way (FHSS) communication has now begun with the hailing device (i.e., a valid message, such as a command, has been received from the hailing device) or if an additional hail from the hailing device is needed, such as if the hailing device failed to receive the ACK signal shown in step 710. If it is determined that an additional hail is needed, the method of block 604 loops back to block 702, where the receiving node 18 once again listens for a hail message on a hailing channel, and the method repeats through the blocks previously described above. That repeated attempt will again involve checking both hailing channels. If, however, it is determined at block 712 that no additional hail is needed, then the method of block 604 advances to block 714, where the receiving node 18 begins analyzing any additional data received from the hailing device, since by this point a successful hail has been acknowledged. An additional communication from the hailing device is needed for the node 18 to take an action. Once the receiving node 18 finishes analyzing the data, or message, received on the FHSS channel, the method of block 604 advances to flow chart marker 716 (shown as an encircled "A"), provided for purposes of illustration to connect the flow chart portion of FIG. 7 with the flow chart portion of FIG. 8, described below.

Figure 8:
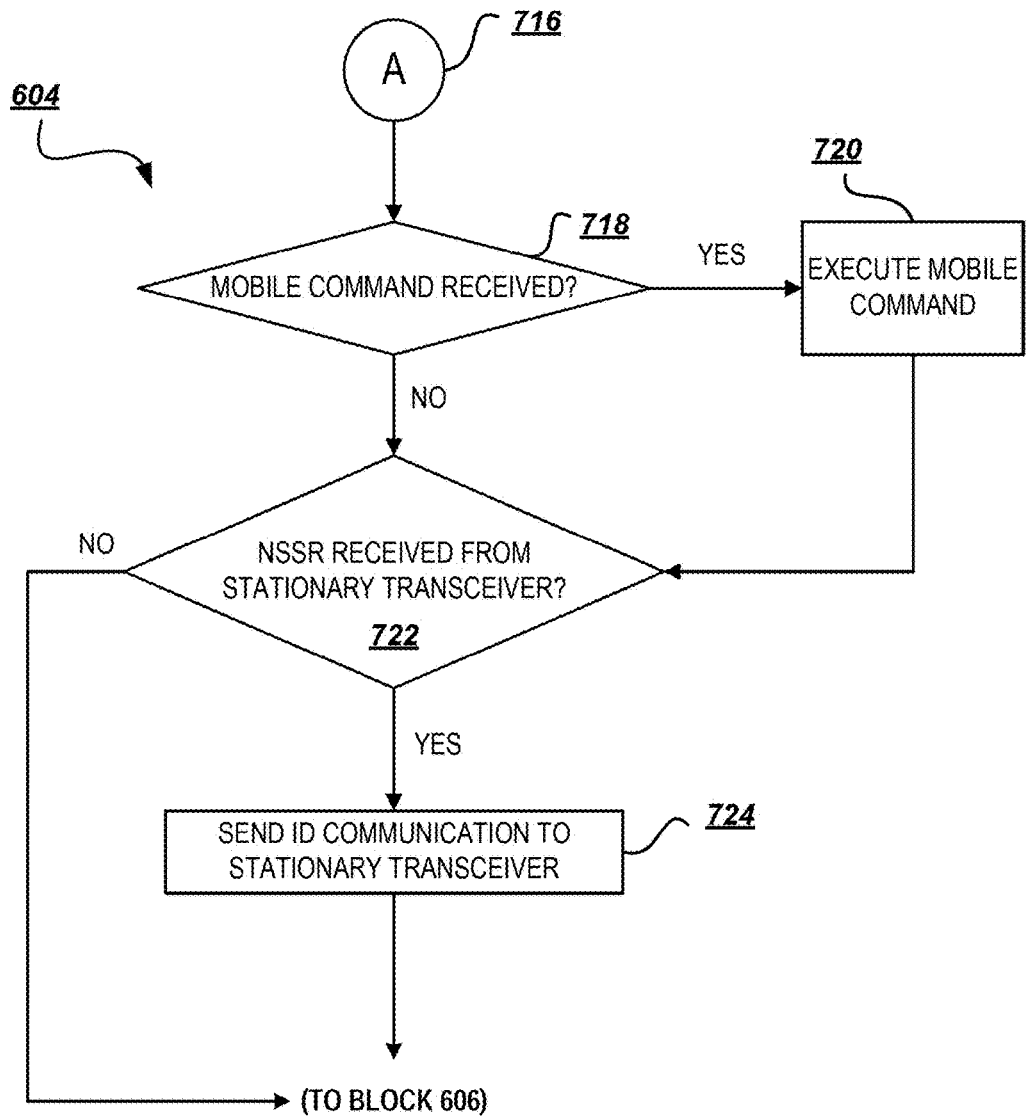

FIG. 8 continues the flow chart for the method of block 604 at the flow chart marker 716. At this point, the receiving node 18 has finished analyzing the data from the hailing device, as described with regard to block 714 of FIG. 7. The method continues from the flow chart marker 716 to decision block 718, where it is determined whether the receiving node 18 received a mobile command from a mobile collector 12, i.e., in this case a mobile collector 12 was the hailing device. If so, the method advances to block 720, where the node 18 executes the mobile command, which may include instructions for the node 18 to, for instance, perform an action, such as to shut off a valve with which the node 18 may be associated. The instructions in the mobile command may instead direct the node 18 to send the mobile collector 12 a specified communication, such as a single reading or a series of readings over a predetermined time period. Any reply communication from the node 18 to the mobile collector 12 is, in one aspect of the present disclosure, sent at a power of about 15 dBm, and at a frequency of about 915 MHz. The instructions could also instruct the node 18 to both perform a task and send a communication. If desired for a hailed connection, the method of block 604 may also include steps representing the sending of an acknowledgement signal by the receiving node 18 to the originator of the mobile command (in this case, mobile collector 12) following receipt of the mobile command, and representing the re-sending of the mobile command upon failure of the originator to receive an acknowledgement from the receiving node 18. Following execution of the mobile command at block 720, the method of block 604 proceeds to decision block 722.

If no mobile communication was received, however, the method of block 604 proceeds directly from decision block 718 to decision block 722. At decision block 722, a determination is made as to whether the receiving node 18 has received a Network System Status Request (NSSR), or equivalent, from a hailing device, such as from the stationary transceiver 109 in hub 108, also referred to as a collector. If not, then the method again skips to block 606 of FIG. 6, to be described herein. If, however, the receiving node 18 has received an NSSR from the stationary transceiver, then the method of block 604 advances to block 724, where the node 18 sends an ID communication to the stationary transceiver in response to the NSSR, the ID communication containing both a node ID for node 18 (used for AMI communications) and the register ID for the meter register to which it is connected (used for AMR communications). This ID communication from the node 18 is, in one aspect of the present disclosure, sent at a power of about 20 dBm, and at a frequency of about 915 MHz. If desired for a hailed connection, the method of block 604 may also include steps representing the sending of an acknowledgement signal by the receiving node 18 to the originator of the NSSR (i.e., the stationary transceiver 109) following receipt of the NSSR, and representing the re-sending of the NSSR upon failure of the originator to receive an acknowledgement from the receiving node 18. Block 724 marks the end of the flow chart of FIGS. 7 and 8, and thus the end of the method of block 604, so the method proceeds from block 724 to block 606 of FIG. 6, described below.

Referring again to FIG. 6, at decision block 606, it is ascertained whether the receiving node 18 has also received a parent assignment command from the stationary transceiver 109 in the hub 108. If received at block 606, the parent assignment command is interpreted as an instruction that the node 18 continue in AMI mode to receive all further communications from a stationary transceiver (such as hub 108) identified in the parent assignment command, and to stop sending AMR beacons. Thus, the parent assignment command causes the node 18 to transition to an AMI mode, as shown at block 608. Once in AMI mode, the node 18 may receive and execute further commands from the stationary transceiver 109, such as a command to perform periodic uploads of data collected by the node 18, with the periodic uploads to occur at time intervals specified in the command, for example. If, however, the node 18 does not receive a parent assignment command, method 600 loops back to block 602, where the node 18 resumes sending its AMR beacons. Other implementations include other methods of determining whether a hailing device is effectively instructing the node 18 to switch to an AMI mode, e.g., the NSSR message itself could be interpreted as such a command without waiting for a parent assignment command. Additional processes also may be included, and it should be understood that the processes depicted in FIGS. 6-8 represent illustrations, and that other processes may be added or existing processes may be removed, modified, or rearranged without departing from the scope and spirit of the present disclosure.

Although several embodiments have been disclosed in the foregoing specification, it is understood by those skilled in the art that many modifications and other embodiments will come to mind to which this disclosure pertains, having the benefit of the teaching presented in the foregoing description and associated drawings. It is thus understood that the disclosure is not limited to the specific embodiments disclosed hereinabove, and that many modifications and other embodiments are intended to be included within the scope of the appended claims. Moreover, although specific terms are employed herein, as well as in the claims which follow, they are used only in a generic and descriptive sense, and not for the purposes of limiting the described disclosure, nor the claims which follow.

That which is claimed is:

1. A method, comprising:
   periodically sending an Advanced Meter Reading (AMR) beacon from a node at a first regular time interval, the AMR beacon containing a register identification (ID) and a reading detected by the node;
   periodically listening, at the node, for a communication such that instances of listening occur at a second regular time interval smaller than the first regular time interval; and
   receiving the communication at the node;
   wherein the communication is a repeating pattern of hail messages, and wherein each hail message has a hail duration smaller than the second regular time interval.

2. The method of claim 1, wherein the hail messages alternate between at least two hailing channels of the node.

3. The method of claim 1, wherein instances of listening by the node have a timing with respect to the repeating pattern of hail messages such that if an instance of listening falls within an invalid period for one hail message, a next instance of listening will fall within a valid period for a later hail message, enabling a successful hail.

4. The method of claim 1, wherein the second regular time interval is between 16 and 17 times larger than the hail duration.

5. The method of claim 4, wherein the hail duration is about 180 milliseconds (ms).

6. The method of claim 1, wherein an initial instance of listening occurs after an initial AMR beacon and is separated from the initial AMR beacon by an offset ranging from and including about 0.2 seconds to and including about 10 seconds.

7. The method of claim 1, wherein the first regular time interval ranges from and including about 1 second to and including about 30 seconds, the second regular time interval ranges from and including about 0.5 seconds to and including about 30 seconds, and the node repeatedly sends the AMR beacon at a power of about 15 dBm, and at a frequency of about 915 Mhz.

8. The method of claim 1, further comprising receiving a mobile command at the node.

9. The method of claim 8, further comprising executing the mobile command by performing an action selected from a group consisting of performing a task, sending a reply communication, and both performing a task and sending a reply communication.

10. The method of claim 9, wherein any reply communication from the node is sent at a power of about 15 dBm, and at a frequency of about 915 Mhz.

11. The method of claim 1, further comprising:
    receiving at the node a Network System Status Request (NSSR) from a stationary transceiver; and
    sending an identification (ID) communication from the node in response to the NSSR, the ID communication containing both a node ID and the register ID.

12. The method of claim 11, further comprising receiving, at the node, a parent assignment command, the parent assignment command causing the node to transition to an Advanced Metering Infrastructure mode.

13. The method of claim 1, further comprising:
    receiving data from a stationary transceiver;
    processing the data to determine whether the periodic sending of the AMR beacons should be halted; and
    halting the sending of the AMR beacons responsive to a determination that the data comprises an instruction to stop sending AMR beacons.

14. A node, comprising:
    a processor; and
    logic processed by the processor to
    periodically send an Advanced Meter Reading (AMR) beacon from the node at a first regular time interval, the AMR beacon containing information identifying the node and containing a reading detected by the node,
    periodically listen, at the node, for a communication such that instances of listening occur at a second regular time interval smaller than the first regular time interval, and
    receive the communication at the node,
    wherein the communication is a repeating pattern of hail messages, and wherein each hail message has a hail duration smaller than the second regular time interval.

15. The node of claim 14, wherein the logic is further processed by the processor to detect hail messages alternating between at least two hailing channels of the node.

16. The node of claim 14, wherein the logic is further processed by the processor to time instances of listening by the node with respect to the repeating pattern of hail messages such that if an instance of listening falls within an invalid period for one hail message, a next instance of listening will fall within a valid period for a later hail message, enabling a successful hail.

17. The node of claim 14, wherein the logic is further processed by the processor to:
   receive at the node a Network System Status Request (NSSR) from a stationary transceiver; and
   send an identification (ID) communication from the node in response to the NSSR, the ID communication containing both a node ID and a register ID.

18. The node of claim 17, wherein the node is further processed by the processor to:
   receive a parent assignment command; and
   cause the node to transition to an Advanced Metering Infrastructure mode in response to receipt of the parent assignment command.

19. The node of claim 14, wherein the logic is further processed by the processor to:
   receive data from a stationary transceiver;
   process the data to determine whether the periodic sending of the AMR beacons should be halted; and
   halt the sending of the AMR beacons responsive to a determination that the data comprises an instruction to stop sending AMR beacons.

\* \* \* \* \*